United States Patent

Szwarc et al.

[15] 3,638,312

[45] Feb. 1, 1972

[54] APPARATUS FOR CONCENTRATING ULTRAVIOLET RADIATION, FOR CURING POLYMERIZABLE COMPOSITIONS AND METHOD FOR HARDENING FILLING COMPOSITIONS IN DENTAL CAVITIES

[72] Inventors: John J. Szwarc, North Versailles, Pa.; Thomas E. Doyle, Port Washington, Wis.

[73] Assignee: Freeman Chemical Corporation, Port Washington, Wis.

[22] Filed: Dec. 29, 1969

[21] Appl. No.: 888,350

[52] U.S. Cl. ....................32/15

[51] Int. Cl. ....................A61k 5/02

[58] Field of Search....................128/398, 6, 11; 32/DIG. 7, 32/27, 17, 22

[56] References Cited

UNITED STATES PATENTS

| | | | |
|---|---|---|---|
| 3,010,357 | 11/1961 | Hirschowitz | 128/6 |
| 3,494,354 | 2/1970 | Yokota et al. | 128/398 |
| 3,327,712 | 6/1967 | Kaufman et al. | 128/398 |

*Primary Examiner*—Robert Peshock
*Attorney*—Harry B. Keck and George E. Manias

[57] ABSTRACT

Method for curing polymerizable compositions employing ultraviolet radiation exposure. The concentrated ultraviolet radiation may be employed to cure certain polymerizable resinous compositions which can be initiated by exposure to ultraviolet radiation. The method is particularly useful for curing dental cavity filling compositions quickly and with nearly insignificant polymerization exotherm.

1 Claims, 7 Drawing Figures

INVENTOR.
JOHN J. SZWARC
THOMAS E. DOYLE
BY
Warren B. Keck
ATTORNEY

APPARATUS FOR CONCENTRATING ULTRAVIOLET RADIATION, FOR CURING POLYMERIZABLE COMPOSITIONS AND METHOD FOR HARDENING FILLING COMPOSITIONS IN DENTAL CAVITIES

BACKGROUND OF THE INVENTION

1. Field of the Invention

This invention relates to means for curing polymerizable compositions which are susceptible to ultraviolet radiation initiation and more particularly to a method for curing certain polymerizable compositions as dental cavity filling substances.

2. Description of the Prior Art

The variety of dental filling compositions and other resinuous compositions are known in the art to be susceptible to initiation by means of exposure to ultraviolet radiation. Certain dimethacrylate and diacrylate resins are susceptible; for example, see U.S. Pat. Nos. 3,066,112, 3,179,623, 3,256,266 and 3,301,743. At the present time compositions as described in the aforementioned references are cured in the patient's dental cavity by means of free radical initiators which generate substantial exotherms causing some discomfort to the dental patient. Such compositions can be combined with radiation sensitive initiators such as benzophenone and can be cured upon exposure to ultraviolet radiation. In thin films, the cure can be accomplished in less than 1 second. In larger masses, the composition can be cured in longer exposures such as 2 to 3 minutes for cylinders having a diameter of three-sixteenth inch and a length of three-eighth inch. However, needless exposure of the dental patient to ultraviolet radiation is undesirable. The apparatus as described in the present application for concentrating the ultraviolet radiation achieves the desired dental filling cure. Because the resin cure is not initiated until the curable composition is exposed to concentrated ultraviolet radiation, the dental operator can work with the tooth filling and restoring composition leisurely and locate the material in precisely the desired locations of the dental patient's tooth. The technique is especially desirable in restorations of previously installed dental bridgework.

SUMMARY OF THE INVENTION

A source of ultraviolet radiation is provided along with means for causing the radiation to converge into a target region. A flexible fiber optics rod is provided having one end disposed in the target region for receiving the concentrated ultraviolet radiation and having its other end freely movable so that the dentist or dental technician can direct the radiation through the flexible fiber optic rod and concentrate the radiation against the patient's filled cavity for a predetermined time sufficient to achieve cure of the composition. The converging means may include optical lenses and/or optical reflectors. Means are provided for adjusting the amount of ultraviolet radiation which impinges upon the one end of the fiber optics rods which is in the target region.

DESCRIPTION OF THE PREFERRED EMBODIMENT(S)

Figure 2:
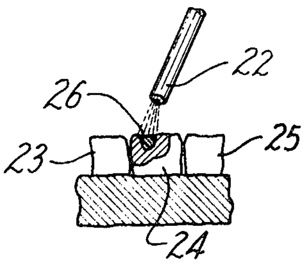
FIG. 2 is an illustration partly in cross section showing the cure of a dental filling composition according to this invention.

A dental patient, indicated by the numeral 10, is seated in a dental chair 11 for dental care. Mounted on the dentist's working table 12 is an ultraviolet radiation condensing device 13 according to this invention. An electric cable 14 provides electrical power through a wall plug 15. Adjustment knobs 16, 17, 18 are provided on the unit 13 for purposes hereinafter described. A flexible fiber optic rod 19 extends from the unit 13 to the mouth 20 of the patient 10. A photographic shutter release cable 21 preferably is provided as shown, extending from the unit 13. The flexible fiber optic rod 19 has a forward delivery end 22 which is illustrated also in FIG. 2. Three of the patient's teeth 23, 24, 25 are illustrated in cross section in FIG. 2. The tooth 24 contains a cavity filling 26 against which ultraviolet radiation is directed from the delivery end 22 as shown in FIG. 2. If the cavity filling 26 is sensitive to and can bring about a cure of the filling material 26 in a relatively short period of time, from about 5 to about 500 seconds without causing discomforting temperature rise within the tooth 24 and without exposing the patient's adjoining mouth surfaces to excessive ultraviolet radiation.

It may be desirable to provide a convenient clamping device to permit the delivery end 22 to be rigidly secured in the intended radiating relationship to the cavity filling 26.

Figure 3:
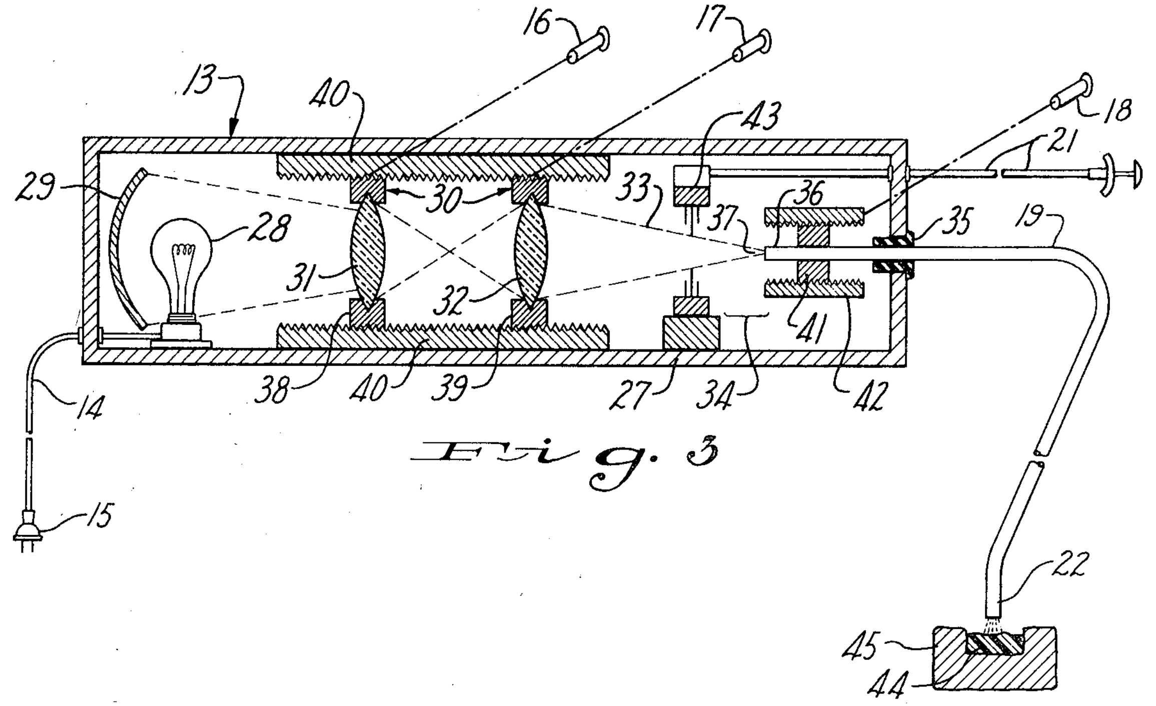
FIG. 3 is a view partly in cross section illustrating the apparatus of the present invention for use in curing a polymerizable composition.

The condensing apparatus 13 is more fully illustrated in FIG. 3 wherein a suitable housing 27 contains a source of ultraviolet radiation such as a UV-lamp 28 connected through a wire 14 and plug 15 to a source of electrical power. A concave optical reflector 29 preferably is mounted within the housing 27 to direct radiation from the bulb 28 into a condensing lens system including a pair of convex lenses 31, 32 which may be fabricated from heat resistant glass but preferably are fabricated from quartz to provide insignificant attenuation of the ultraviolet radiation. Other materials are available which will deliver ultraviolet radiation, such as special purpose glass compositions. The condensing lens system 30 causes the ultraviolet radiation to converge, as indicated by the broken lines 33, into a target region 34. A flexible fiber optic rod 19 enters the housing 27 through a grommeted opening 35 and has its receptor end 36 disposed within the target region 34 whereby the ultraviolet radiation is directed against the receptor end 36. It is a known property of flexible fiber optic rods, such as the rod 19, that they can deliver illumination in bending, twisting and turning paths from the receptor end 36 to the delivery end 22. The flexible fiber optic rods also will deliver ultraviolet radiation without objectionable loss of intensity. Preferably the fibers in the fiber optic rod are quartz glass or other special glass compositions which minimize attenuation of the radiation.

The optical lenses 31, 32 preferably are mounted within the housing 27 in an adjustable manner whereby their position relative to the radiation source 28 and relative to each other can be altered for the purpose of adjusting the focal point 37 of the ultraviolet radiation. One means for accomplishing this adjustment is to provide externally threaded mounting collars 38, 39 for the optical lenses 31, 32 respectively and to mount the externally threaded collars 38, 39 within an internally threaded sleeve 40. Suitable adjustment means such as knobs 16, 17 are provided to move the mounting collars 38, 39 within the sleeve 40 for adjusting the location of the focal point 37.

Similarly the presentation of the receptor end 36 can be adjusted by providing an externally threaded collar 41 on the flexible fiber optic rod 19 adjacent to the receptor end 36 and threadedly engaging this collar within an internally threaded sleeve 42. The precise position of the receptor end 36 can be regulated by the adjustment knob 18.

Also mounted within the housing 27 is a shutter device 43, for example, an iris diaphragm of the type employed in photographic cameras. A suitable shutter release cable 21 extends through the walls of the housing 27 to enable the operator to open the shutter 43 for a predetermined period of time to regulate the quantity of ultraviolet radiation which enters into the receptor end 36 and hence which is delivered from the delivery end 22.

As shown in FIG. 3 the delivery end 22 is maintained in initiating relationship to a supply 44 of polymerizable resinous composition confined within a cavity 45.

Figures 4, 5, 6, 7:
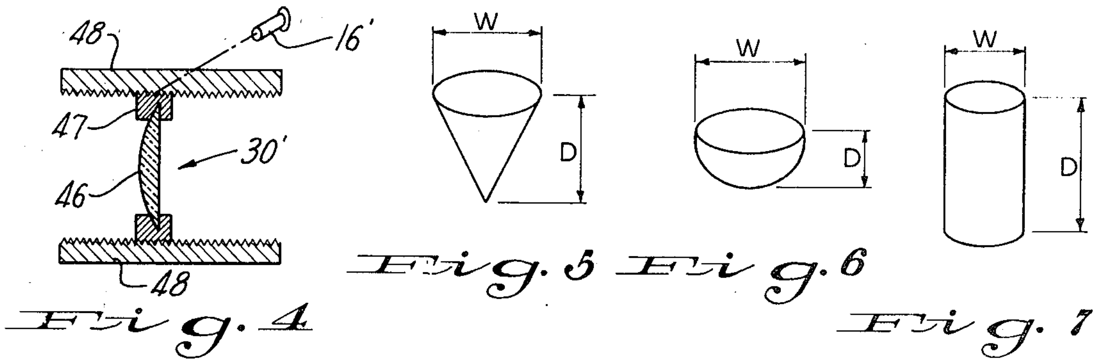
FIG. 4 is an illustration in cross section showing an alternative optical lens converging system differing from that shown in FIG. 3.
FIGS. 5, 6 and 7 are perspective illustrations of three different cured resinuous articles produced by the present invention.

As shown in FIG. 4, the optical lens system 30' may include a single lens 46 in place of the multiple lenses 31, 32 of FIG. 3. The single lens 46 is mounted in a suitable holder 47 which is adjustably positioned on a supporting member 48 such as a threaded sleeve (only one wall shown). Suitable adjustment knob 16' is provided to locate the optical lens 46.

EXAMPLE 1

Figure 1:
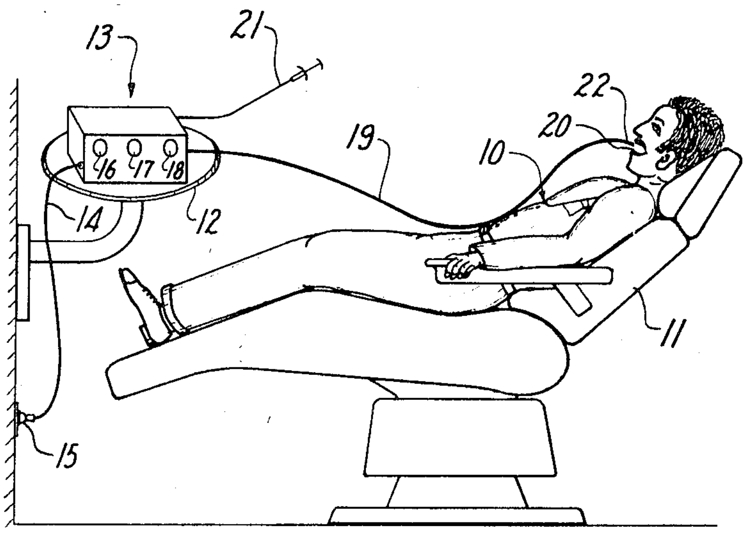
FIG. 1 is a perspective illustration of a dental patient seated in a dental operating chair and illustrating the present apparatus.

An ultraviolet radiation density meter (trademark Blak-Ray) was masked with opaque black paper having a hole 0.25 inch in diameter. The ultraviolet radiation from a commercial lamp (85 watts, Mercury vapor lamp) was measured in the meter through the 0.25-inch hole. Thereafter the same lamp was employed as a source of ultraviolet radiation with a quartz fiber optic rod substantially as illustrated in FIG. 1, except that the optical lens system 30' of FIG. 4 was employed in place of the system 30 of FIG. 1. The delivery end of the fiber optic rod was directed at the radiation density meter through the 0.25-inch hole in the opaque black paper. In one test the fiber optic rod delivered 71 percent of the short wave ultraviolet radiation (2,537 Angstrom units) and 10 percent of the long wave ultraviolet radiation (3,650 Angstrom units).

EXAMPLE 2

A polymerizable resin composition was prepared including by weight 1.00 parts of the diester reaction product of 2 mols methacrylic acid and 1 mol of diglycidyl ether of bisphenol-A;

0.02 parts methylanthraquinone 0.18 parts acetophenone.

The resin composition was blended with conventional inert dental extenders e.g., pulverized silica, see U.S. Pat. No. 3,194,783, for example. The resulting composition was poured into open-top molds in the shapes illustrated in FIGS. 5 and 6 and a sleeve, open-top and bottom in the shape illustrated in FIG. 7. The molds had the dimensions set forth in the following Table I. The delivery end of the fiber optic rod was positioned 0.25 inch from the mold for the exposure time set forth in Table I. The delivery end was directly in confrontation with the circular base of the conical article of FIG. 5; the delivery end was in direct confrontation with the circular base of the dome-shaped article in FIG. 6; the delivery end was in direct confrontation with each of the two cylindrical bases of the cylinder shown in FIG. 7.

TABLE I— Curing Polymerizable Resins

| Specimen | Dimensions (inches) D | W | Exposure time (minutes) |
|---|---|---|---|
| FIG. 5 shape | | | |
| 1 | 0.087 | 0.162 | 3 |
| 2 | 0.103 | 0.200 | 3 |
| 3 | 0.112 | 0.221 | 3 |
| 4 | 0.133 | 0.256 | 4 |
| FIG. 6 shape | | | |
| | 0.040 | 0.275 | 4 |
| | 0.050 | 0.312 | 4 |
| | 0.070 | 0.370 | 4 |
| FIG. 7 shape | | | |
| | 0.340 | 0.173 | 5* |

*The cylinder mold was exposed on each round end for 5 minutes, i.e., a total exposure of 10 minutes.

In all instances the resinous articles were well cured and established appreciable Barcol hardness values.

It can be seen from inspection of Table I that the articles produced by practicing this invention resemble in size and somewhat in configuration typical dental fillings. Satisfactory cures of the articles can be achieved without undue exposure of the dental patient to general ultraviolet radiation.

We claim:

1. The method of curing a polymerizable dental filling composition in the tooth cavity of the dental patient comprising
   - filling the said dental cavity with a polymerizable resinous composition which can be initiated through ultraviolet radiation;
   - directing a concentrated beam of ultraviolet radiation into the said patient's mouth and specifically upon said polymerizable composition for a period from 5 to 500 seconds, sufficient to accomplish a cure of the said composition.

* * * * *